Aug. 10, 1943.   D. V. SHUHART   2,326,400
AUTOPERISPHERE
Filed Feb. 3, 1942

INVENTOR
D. V. Shuhart

Patented Aug. 10, 1943

2,326,400

UNITED STATES PATENT OFFICE 2,326,400

AUTOPERISPHERE

Donald V. Shuhart, Fort Worth, Tex.

Application February 3, 1942, Serial No. 429,373

2 Claims. (Cl. 115—20)

The invention relates to improvements in amphibian vehicles of the autoperisphere type and the objects of the improvement are, first, to provide an amphibian vehicle which may be used as a war machine; second, to provide a complete inner sphere rigidly attached to a tubular axle which will thus be capable of being buoyed by any liquid which might enter or be placed between the oblate-spheroid and the inner sphere; third, to provide navigators' hubs capable of housing, in addition to navigators, large and small caliber guns, and the remote controls of electrically propelled mechanisms; fourth, to provide a remotely controlled steering device utilizing the weight of the electric generator unit.

Figure 1:
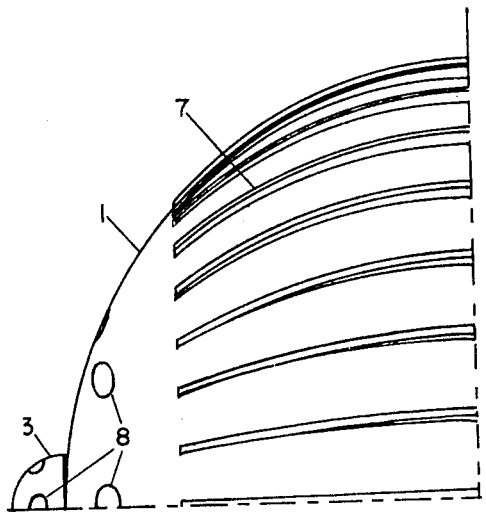
Figure 2:
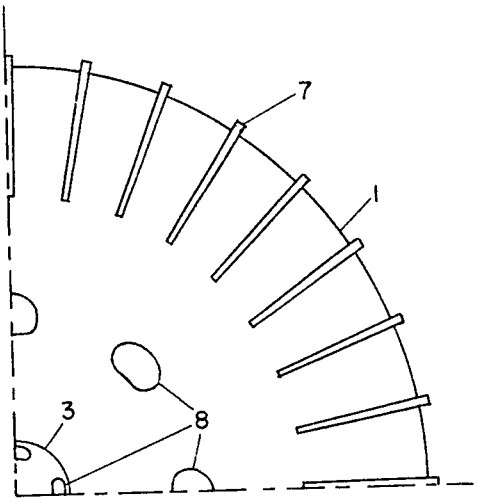
Figure 3:
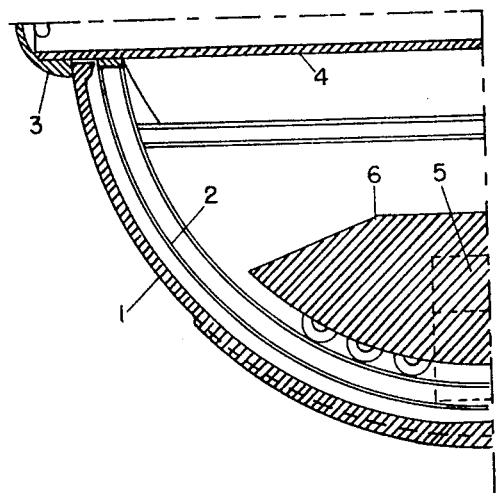
Figure 4:
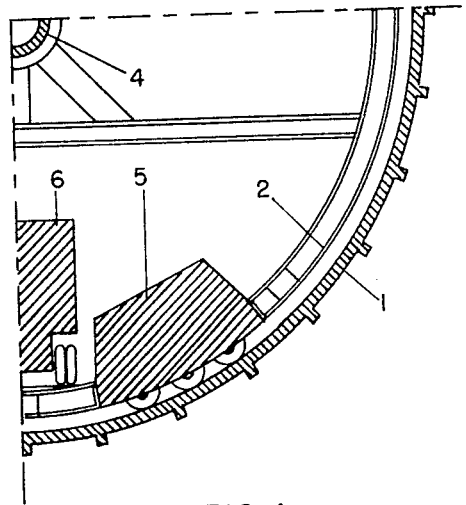

One form of the invention is illustrated in the accompanying drawing in which Figure 1 is a quarter transaxial view of the autoperisphere; Figure 2 is a quarter axial view; Figure 3 is a lower quarter axial section showing the relation of the oblate-spheroid hereafter called the perisphere and inner sphere, and showing the remotely controlled and the laterally movable truck carrying the electric generator unit; Figure 4 is a lower quarter equatorial transaxial section showing the relation of the perisphere and inner sphere and one position of a remotely controlled electric motive element with wheels in contact with the perisphere.

The perisphere 1 constitutes the hull or hull and armor as well as the overhead cover of a marine vehicle or the wheel and armor of a land vehicle. The perisphere 1 may be constructed of any materials commonly used in marine ship construction including steel armor plate.

The inner sphere 2 is an entire sphere rigidly attached to a tubular axle. The inner sphere may be fabricated from steel plate either with or without fabricated steel ribs which may be required only in the large models, including a battle autoperisphere. The inner sphere 2 is fastened either by welding or by clamps to an axle 4, which extends through bearings in the perisphere to receive the navigators' hubs 3 3.

The navigators' hubs 3 3 house the same functions as a bridge on a ship. They may also be fitted with small cannon and machine guns.

The axle 4 performs several important functions uncommon to axles in general. This axle is a large tube with suitable apertures so that it may serve, first, as a passageway to the navigators' hubs 3 3, second, as a passageway for electric control cables from the navigators' hubs 3 3 to the motive element 5, and to the laterally movable truck 6 or for telephone lines to these or other parts of the autoperisphere; third, as a passageway for conduits through which combustion fumes may be conducted for ejection; fourth, as a passageway for conduits for air intake when all other ports are closed; fifth, as a housing for two or more large naval guns which may be fired in a general axial direction; sixth, for any other purpose which requires access to the exterior while the autoperisphere is in motion.

The motive element 5 may be of any type of electric motor driven mechanism such as are in common use in electric railway cars. The motive element regardless of its nature must be attached peripherally to or push tangentially against the inner sphere 2 and must have contact with the perisphere 1 at an equatorial zone either by wheels, tractor treads or gears.

A truck 6 driven by an electric motive element, which may be of the same type used for the motive element 5 and carrying a Diesel or other motor driven electric generator, is laterally movable toward either pole of the autoperisphere.

The tread 7 7 consists of metal strips, curved to fit the perisphere, attached longitudinally at an equatorial zone and designed to engage the water but designed also to permit travel on land. The tread performs an important function in guiding the amphibian autoperisphere when it is in water. When the axle 4 of the revolving perisphere 1 is tilted in one direction or the other from a level position by the shifting of ballast 6, the equatorial portion of the tread 7 7, turning at a greater speed than the portion of the tread nearer the axle 4, causes the course of the autoperisphere to change toward the direction the axle 4 is tilted by the shifting of ballast 6.

The port holes 8 are similar to like structures in common use. They may be made large enough in some instances to serve in loading and unloading cargo.

I am aware that prior to my invention, engines of war, marine vessels and spherical vehicles have been made or invented with an outer sphere rotating independently of an axle around an inner sphere; or with a barrel-shaped hull rotating around a cradle supported by a hollow axle; or with an outer sphere rotating around a cradle supported by a hollow axle; or with an outer sphere rotating around an inner propelling mechanism inside of which is a spherical coach. I, therefore, do not claim such a combination broadly; but I claim:

1. In an amphibian vehicle, called an autoperisphere, having the combination of an oblate-spheroid with axle bearings in polar positions and a concentrically suspended inner sphere rigidly attached to a tubular axle extending through the bearings of the oblate-spheroid and a laterally movable, electrically propelled, truck-mounting for a generator unit, consisting of a Diesel or other engine directly connected to an electric generator, supported by wheels in contact by friction or by cogs with the inner surface of the inner sphere and movable only in a lateral direction toward either pole of the oblate-spheroid.

2. In an amphibian vehicle, called an autoperisphere, having the combination of an oblate-spheroid with axle bearings in polar positions and a concentrically suspended inner sphere rigidly attached to a tubular axle extending through the bearings of the oblate-spheroid and to the ends of which are rigidly attached hemispherical, hollow navigators' hubs and having in said inner sphere a laterally movable, electrically propelled, truck-mounting for an electric generator unit, supported by wheels in contact with the inner surface of the inner sphere and movable only in a lateral direction toward either pole of the oblate-spheroid said movement being regulated by an electrical remote control housed in each of said navigators' hubs.

DONALD V. SHUHART.